(12) United States Patent
Jensen et al.

(10) Patent No.: US 7,387,347 B2
(45) Date of Patent: Jun. 17, 2008

(54) BRAKE SYSTEM FOR A MOTORCYCLE AND A METHOD OF FILLING THE BRAKE SYSTEM

(75) Inventors: Aaron Jensen, Delafield, WI (US); Michael Murphy, Sussex, WI (US); Paul Murray, Germantown, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 138 days.

(21) Appl. No.: 11/169,324

(22) Filed: Jun. 28, 2005

(65) Prior Publication Data

US 2007/0024108 A1 Feb. 1, 2007

(51) Int. Cl.
*B60T 13/00* (2006.01)
*B60T 11/00* (2006.01)

(52) U.S. Cl. ..................... 303/9.64; 188/352
(58) Field of Classification Search ............... 188/352; 303/9.64; 141/65
See application file for complete search history.

(56) References Cited

U.S. PATENT DOCUMENTS

| | | | | |
|---|---|---|---|---|
| 4,318,460 A | * | 3/1982 | Kosinski | 188/352 |
| 5,273,141 A | * | 12/1993 | Veret et al. | 188/352 |
| 5,410,881 A | * | 5/1995 | Ellis | 60/584 |
| 5,964,326 A | * | 10/1999 | Lee et al. | 188/352 |
| 6,196,364 B1 | * | 3/2001 | Fouts | 188/352 |
| 6,250,447 B1 | * | 6/2001 | Brandl et al. | 192/85 R |
| 6,298,961 B1 | * | 10/2001 | Hageman et al. | 188/352 |

OTHER PUBLICATIONS

Brake Bleeding / ABS & Standard, Apr. 2004, by Stephan Karlan.*
Brake Fill Process Through Master Cylinder Assembly—Described in the attachment entitled "Statements of Relevance", admitted prior art.
Brake Fill Process Through Master Cylinder Assembly Using Air Evacuation—Described in the attachment entitled "Statements of Relevance", admitted prior art.
Brake Fill Process Through Bleeder Fitting—Described in the attachment entitled "Statement of Relevance", admitted prior art.

* cited by examiner

*Primary Examiner*—Melody M Burch
(74) *Attorney, Agent, or Firm*—Michael Best & Friedrich LLP (57) ABSTRACT

A method of filling a brake system for a motorcycle including a brake system having a master cylinder assembly and a caliper assembly. The master cylinder assembly includes a housing and a cover coupled to the housing to define an enclosed reservoir. The caliper assembly includes a fluid passageway and a fitting adjustable to selectively provide fluid communication with the fluid passageway. The motorcycle also includes a brake line coupled between the master cylinder assembly and the caliper assembly to fluidly connect the reservoir and the fluid passageway. The method also includes substantially evacuating the reservoir, brake line and fluid passageway, coupling a fluid source to the fitting, passing fluid from the fluid source through the fitting, and filling the reservoir, brake line, and fluid passageway with the fluid passed through the fitting from the fluid reservoir.

8 Claims, 7 Drawing Sheets

BRAKE SYSTEM FOR A MOTORCYCLE AND A METHOD OF FILLING THE BRAKE SYSTEM

BACKGROUND

The present invention relates to brake systems for motorcycles, and more particularly to methods of filling brake systems for motorcycles.

Typical motorcycle brake systems include a master cylinder assembly, a caliper assembly, and a brake line coupling the master cylinder assembly to the caliper assembly. Actuation of a hand lever of the master cylinder assembly pressurizes brake fluid through the brake lines and into the caliper assembly to press brake pads of the caliper assembly against a wheel rotor to slow or stop the rotation of the wheel. The master cylinder assembly includes a reservoir that contains the brake fluid supplied to the brake system.

For the brake system to work properly, the entire brake system must be filled with the brake fluid, except for some allowable air at the top of the reservoir. It is known to fill the brake system with fluid by removing a cover of the master cylinder assembly, filling the reservoir with brake fluid, opening a bleeder fitting located on the caliper assembly, pumping the brake lever until the fluid exits the bleeder fitting, and adding fluid to the reservoir as needed. When full, the cover is replaced and the bleeder fitting is closed. This process is time consuming and is not desirable for mass production.

In production, the fill process is performed after the brake system is attached to the motorcycle. Another known fill process used in this environment is to remove the cover, attach an adapter to the reservoir, use the adapter to evacuate the air from the brake system through the reservoir, use the adapter to fill the brake system with brake fluid through the reservoir, remove the adapter exposing the fluid within the reservoir, and replace the cover onto the housing to seal the reservoir. The bleeder fitting remains closed throughout the entire process.

Other processes fill brake fluid from the bleeder fitting. In this process, the cover is removed, the bleeder fitting is opened, an adapter is attached to the bleeder fitting, the adapter passes brake fluid through the bleeder fitting to fill the brake system, the cover is replaced, the adapter is removed, and the bleeder fitting is closed.

These known fill processes generally have used either Dot 3, Dot 4, or Dot 5 brake fluid. Due to fluid characteristics required by modern antilock braking systems, Dot 4 brake fluid is becoming more common. Dot 4 brake fluid is more corrosive than Dot 5 brake fluid and has the potential to damage the cosmetic appearance of certain components of the motorcycle, such as the painted tank, if spilled or splashed. Because of this potential for cosmetic damage, the known fill processes that fill the brake system with the cover removed from the housing are disadvantageous. In addition, it is time consuming to remove and replace the cover during the fill process increasing process cycle times and the manufacturing expense of the motorcycle.

SUMMARY

The present invention provides a method of filling a motorcycle brake system having a master cylinder assembly and a caliper assembly. The master cylinder assembly includes a housing and a cover coupled to the housing to define an enclosed reservoir. The caliper assembly includes a fluid passageway and a bleeder fitting adjustable to selectively provide fluid communication with the fluid passageway. The motorcycle also includes a brake line coupled between the master cylinder assembly and the caliper assembly to fluidly connect the reservoir and the fluid passageway. The method includes substantially evacuating the reservoir, brake line and fluid passageway, coupling a fluid source to the fitting, passing fluid from the fluid source through the fitting, and filling the reservoir, brake line, and fluid passageway with the fluid passed through the fitting from the fluid reservoir.

The present invention also provides a master cylinder assembly for a brake system of a motorcycle. The master cylinder assembly includes a housing, a cover, and a sight glass. The cover is coupled to the housing to define a reservoir adapted to contain a fluid. The sight glass is received within an aperture of the cover and is adapted to indicate the level of the fluid within the reservoir. The sight glass includes a top portion, a bottom portion, and a middle portion between the top and bottom portions. The top and bottom portions each include a perimeter sized to be received within the aperture and to seal the reservoir, and the middle portion includes a reduced perimeter relative to the top and bottom portions. The sight glass is movable between raised and lowered positions. The bottom portion is received within the aperture and seals the reservoir in the raised position. The top portion is received within the aperture and seals the reservoir in the lowered position. The middle portion allows fluid flow through the aperture when the sight glass is moved from the raised position to the lowered position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
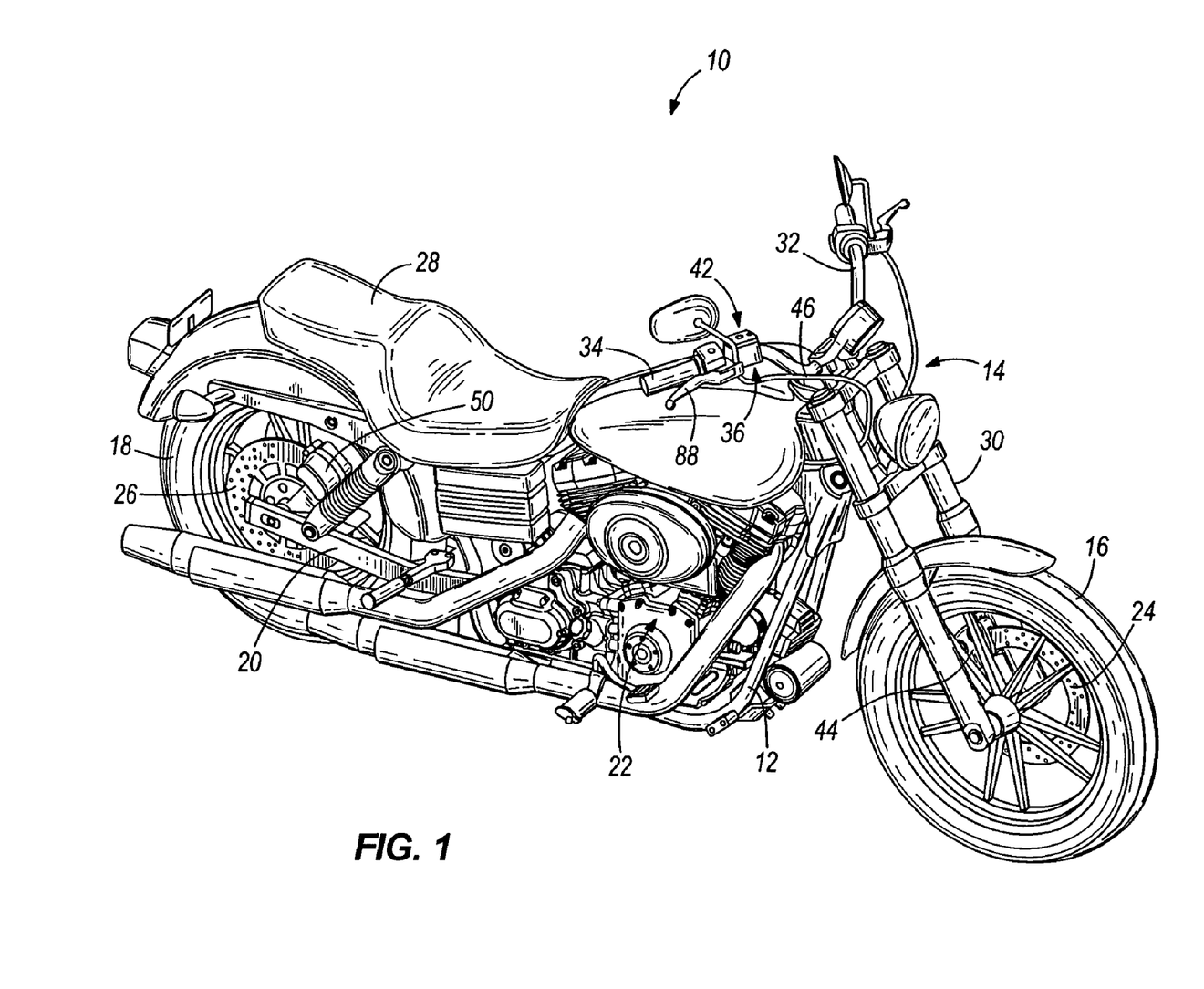
FIG. 1 is a perspective view of a motorcycle, illustrating a brake system of the motorcycle embodying the present invention.

FIG. 1 illustrates a motorcycle 10 including a frame 12, a steering assembly 14 pivotably mounted to a forward portion of the frame 12, a front wheel 16 rotatably mounted to an end of the steering assembly 14, a rear wheel 18 rotatably mounted to a swing arm 20 that is pivotably connected to a rearward portion of the frame 12, and an engine/transmission assembly 22 mounted to the frame 12 and operably coupled to the rear wheel 18. The front wheel 16 includes a front rotor 24 and the rear wheel 18 includes a rear rotor 26. A seat 28 is coupled to the frame 12 above the rear wheel 18 to support an operator. The steering assembly 14 includes a fork 30, handlebars 32, and controls, such as a throttle grip 34, coupled to the handlebars 32. The operator manipulates the controls to power the engine/transmission assembly 22, drive the rear wheel 18, and propel the motorcycle 10. The operator maneuvers the handlebars 32 to pivot the steering assembly 14 and front wheel 16 to steer the motorcycle 10 while the motorcycle 10 is moving.

The motorcycle 10 also includes a braking system 36 including a front braking assembly and a rear braking assembly. The front braking assembly includes a master cylinder assembly 42 coupled to the handlebars 32, a caliper assembly 44 coupled to the fork 30, and a brake line 46 coupled between the master cylinder assembly 42 and caliper assembly 44. The rear braking assembly includes a master cylinder assembly coupled to a lower portion of the frame 12, a caliper assembly 50 coupled to the swing arm 20, and a brake line (not shown) coupled between the master cylinder assembly and caliper assembly 50.

With respect to the applicability of this invention, the front and rear braking assemblies are substantially similar to each other and therefore, only the front braking assembly will be discussed below in detail. It should be noted that one of ordinary skill in the art would readily understand how the invention, as described below with respect to the front braking assembly, could also be applied to the rear braking assembly.

Figure 2:
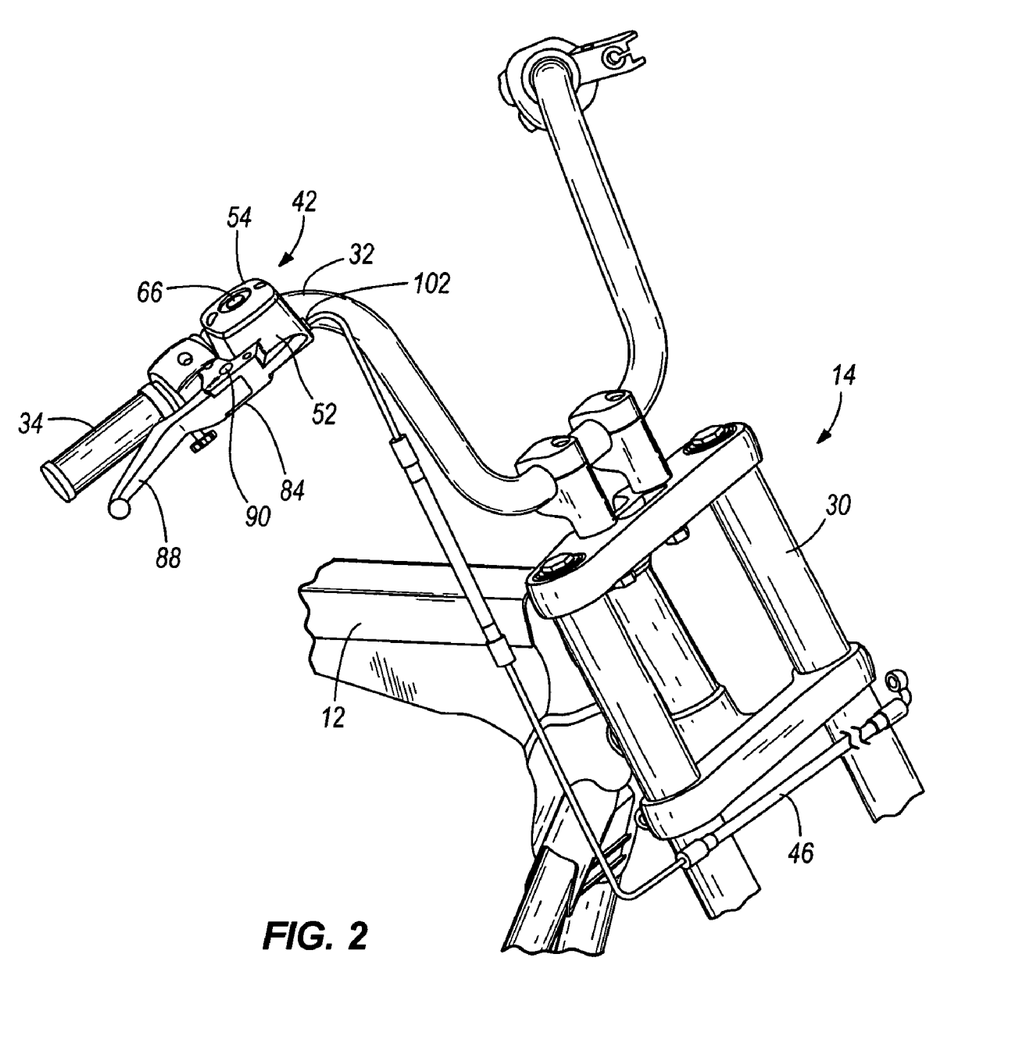
FIG. 2 is a partially exploded view of a portion of a steering assembly of the motorcycle shown in FIG. 1, illustrating a master cylinder assembly and brake line of the brake system.
Figure 4:
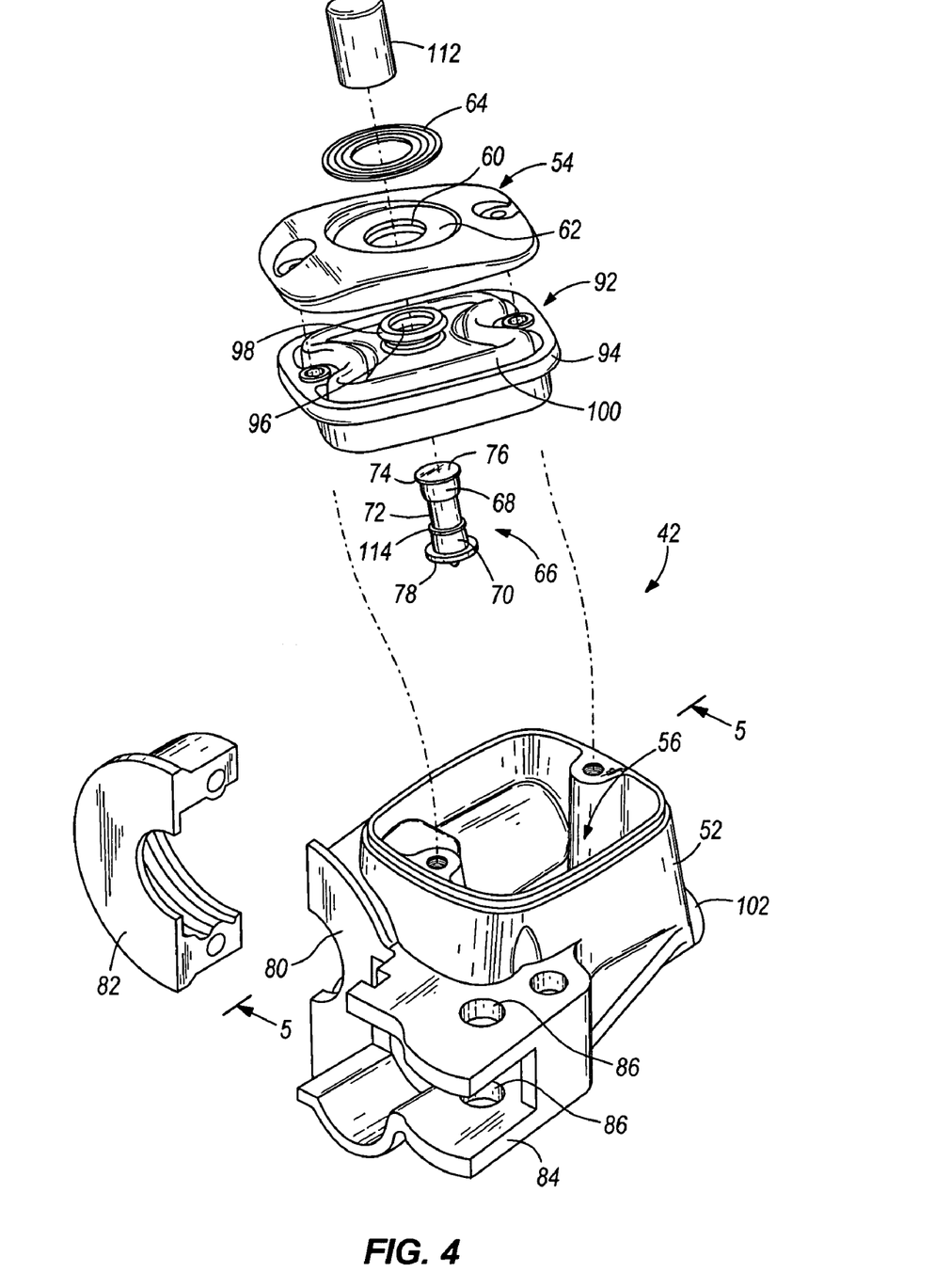
FIG. 4 is an exploded view of the master cylinder assembly shown in FIG. 2.

With reference to FIGS. 2 and 4, the master cylinder assembly 42 includes a housing 52 and a cover 54 coupled to the housing 52 that together define a reservoir 56 for brake fluid 58. Typically, Dot 4 or Dot 5 brake fluid is used. The cover 54 includes a central aperture 60 and a flat annular top surface 62 around the aperture 60. The annular surface 62 provides a mounting location for an annular warning label 64 indicating proper care instructions and the contents of the reservoir 56.

The master cylinder assembly 42 also includes a hour-glass-shaped sight glass 66 that provides an external indication of the level of brake fluid 58 within the reservoir 56. The sight glass 66 includes a top portion 68, a bottom portion 70, and a middle portion 72 between the top and bottom portions 68, 70. The top and bottom portions 68, 70 each include a larger perimeter than the perimeter of the middle portion 72. The sight glass 66 is movable between a raised position (FIGS. 5 and 6) where the bottom portion 70 is received within the aperture 60 and seals the reservoir 56 and a lowered position (FIG. 8) where the top portion 68 is received within the aperture 60 and seals the reservoir 56. The middle portion 72 allows fluid flow through the aperture 60 when the sight glass 66 is moved from the raised position to the lowered position. The top portion 68 includes a top flange 74 that has an increased perimeter from the top portion 68 and that has a tapered top edge 76. The bottom portion 70 includes a bottom flange 78 that has an increased perimeter from the bottom portion 70.

The housing 52 includes a clamp portion 80 that surrounds a portion of the handlebar 32. A clamp 82 surrounds the opposite portion of the handlebar 32 and is fastened to the clamp portion 80 to secure the housing 52 to the handlebar 32. The housing 52 also includes a clevis portion 84 including apertures 86. A hand lever 88 is pivotally connected to the housing 52 by positioning an apertured portion (not shown) of the hand lever 88 within the clevis 84 and inserting a pivot pin 90 through the apertures 86.

The master cylinder assembly 42 includes a gasket 92 positioned between the housing 52 and the cover 54. The gasket 42 includes a perimeter 94, a central aperture 96, and a raised boss portion 98 surrounding the aperture 96. The perimeter 94 is compressed between the cover 54 and the housing 52, and the raised boss portion 98 extends through the aperture 60 of the cover 54 when the cover 54 and housing 52 are fastened together (See FIG. 5). The gasket 92 also defines a baffled or ribbed portion 100 between the perimeter 94 and the central aperture 96. The ribbed portion 100 allows the gasket 92 to flex when acted upon by varying pressure differences between the opposite sides of the gasket 92.

The housing 52 includes a cavity (not shown) that is in fluid communication with the reservoir 56, which supplies fluid 58 to the cavity. The housing 52 also includes a brake line port 102 that is in fluid communication with the cavity. One end of the brake line 46 is fluidly coupled to the brake line port 102 to be in fluid communication with the cavity and the reservoir 56. The master cylinder assembly 42 includes a piston (not shown) that is positioned within the cavity and that is actuable upon pivoting of the hand lever 88. When the hand lever 88 is pivoted, the piston moves within the cavity to pressurize the fluid 58 and move the fluid 58 through the port 102 and through the brake line 46.

Figure 3:
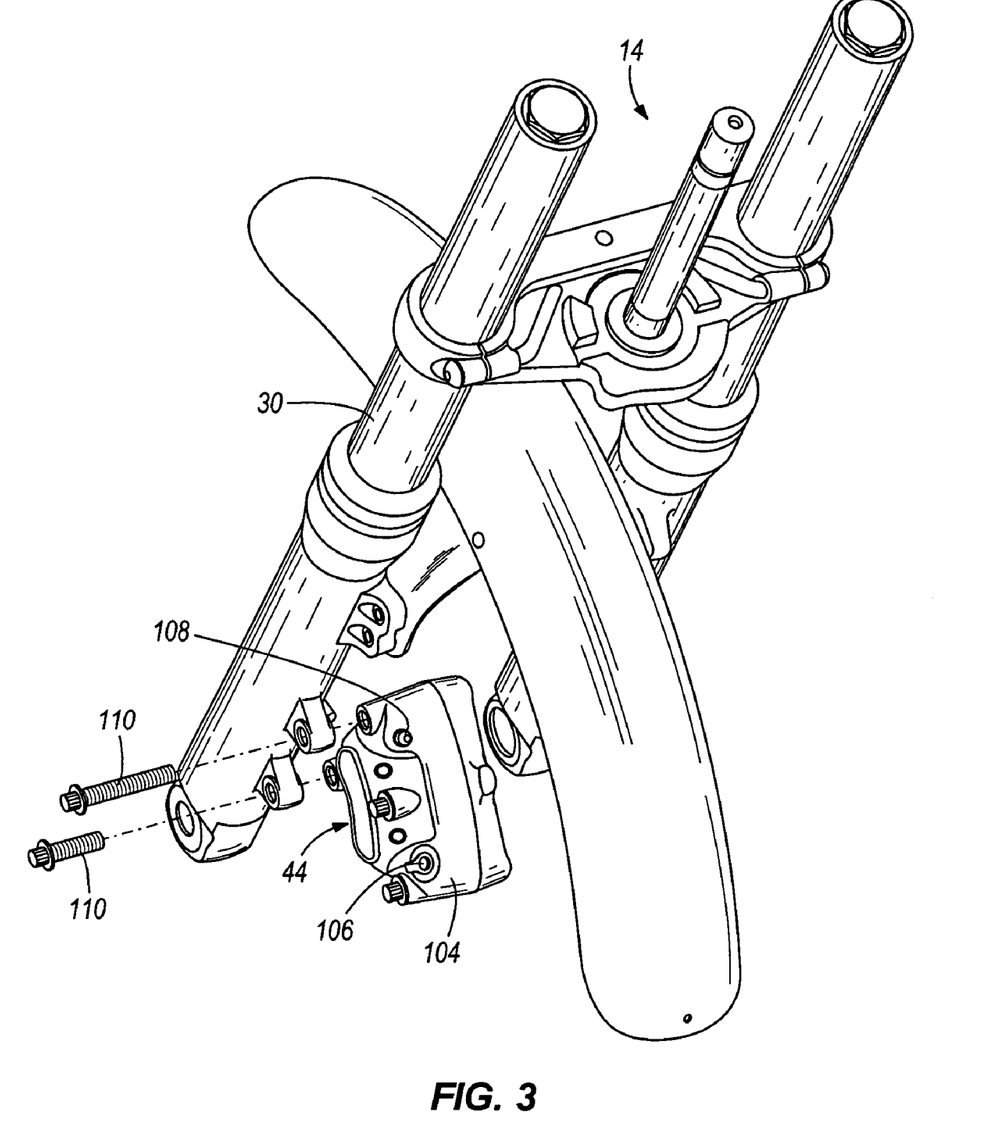
FIG. 3 is a partially exploded view of another portion of the steering assembly shown in FIG. 1, illustrating a caliper assembly of the brake system.

As shown in FIG. 3, the caliper assembly 44 includes a caliper housing 104 that includes a brake line port 106, a fitting or bleeder fitting 108, and an internal fluid passageway (not shown) that fluidly connects the brake line port 106 and the bleeder fitting 108. The bleeder fitting 108 is selectively adjustable to provide access to the fluid passageway. The fluid passageway is also fluidly connected to multiple cavities (not shown) within the caliper housing 104. Each cavity houses a caliper piston for movement within the cavity. The caliper assembly 44 also includes two opposite facing brake pads (not shown) that are slidably mounted to the housing 104. The caliper assembly 44 is mounted to the fork 30 by bolts 110 such that a portion of the front rotor 24 is received within the housing 104 and between the brake pads. The opposite end of the brake line 46 is fluidly coupled to the brake line port 106 to be in fluid communication with the fluid passageways and the cavities. When the fluid 58 is pressurized by the piston in the master cylinder assembly 42, the pressurized fluid 58 moves through the brake line 46 and fluid passageway to fill the cavities and thereby move the pistons inwardly. This movement of the pistons causes the brake pads to be pressed against the rotor 24 to thereby slow the rotation of the rotor 24 and the front wheel 16 or resist rotation of the rotor 24 and the front wheel 16.

Figure 5:
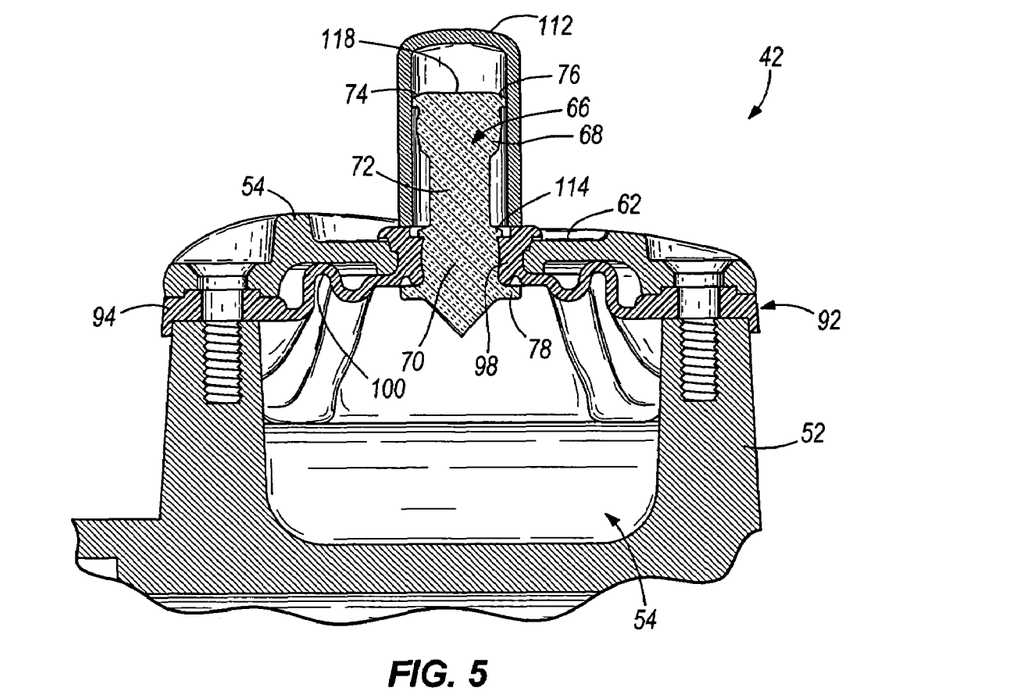
FIG. 5 is a cross section view of the master cylinder assembly taken along line 5-5 of FIG. 4, illustrating the master cylinder assembly in the assembled condition with a sight glass of the master cylinder assembly in the raised position.

The master cylinder assembly 42 is described with reference to FIGS. 4 and 5. The warning label 64 is adhered to the annular surface 62 of the cover 54. Next, the raised boss portion 98 of the gasket 92 is inserted through the aperture 60 of the cover 54. The sight glass 66 is then inserted through the apertures 60, 96 in the cover 54 and the gasket 92 from the bottom side of the cover 54 to a raised position. The tapered edge 76 of the sight glass 66 provides a leading end to facilitate the entrance of the sight glass 66 through the apertures 60, 96. In the raised position, the middle and top portions 72, 68 of the sight glass 66 are exposed above the surface of the cover 54. To protect the sight glass 66 from debris and damage while in the raised position, a cap 112 is pressed over the sight glass 66 and held in place by the interference between the top flange 74 and the inner wall of the cap 112. The cover 54 and gasket 92 are then fastened to the empty housing 52 by inserting screws (not shown) through the respective apertures in each component. The housing 52 is then attached to the handlebars 32 by fastening the clamp 82 to the clamp portion 80 around the handlebars 32.

Figure 9:
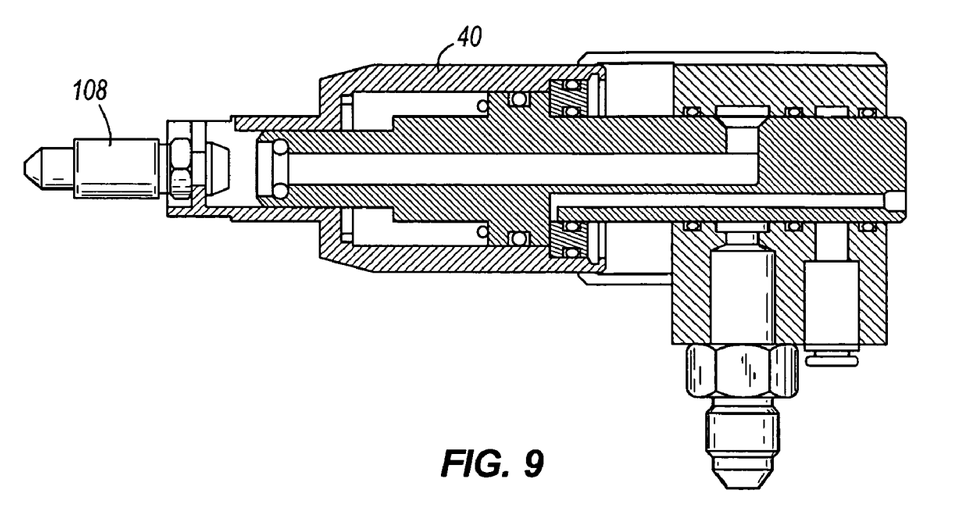
FIG. 9 is a cross section view of an adapter used to couple to a bleeder fitting of the caliper assembly of FIG. 3, illustrating the adapter in an unclamped position.
Figure 10:
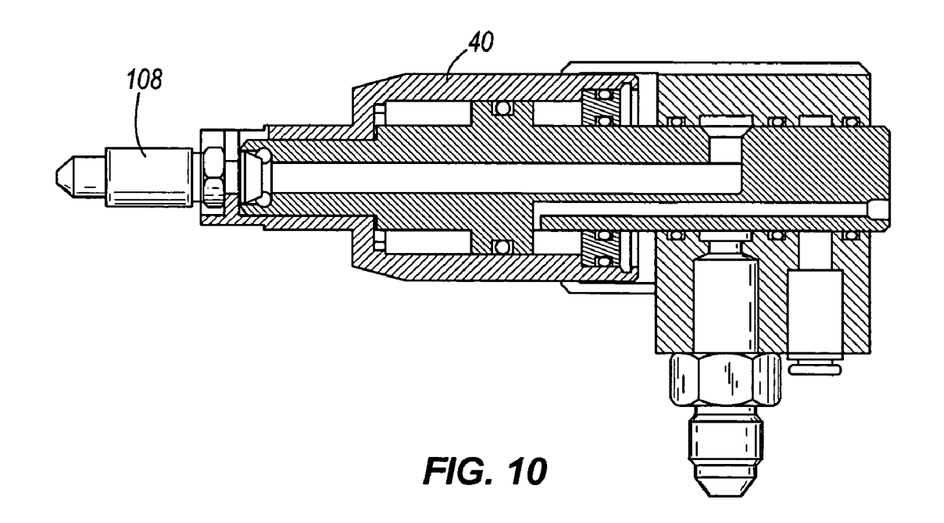
FIG. 10 is a view similar to FIG. 9, illustrating the adapter in a clamped position.

The filling process of the brake system 36 is described with reference to FIGS. 5-8. FIG. 5 illustrates the assembled master cylinder assembly 42 without brake fluid. The sight glass 66 is in the raised position and the bottom portion 70 creates a seal with the gasket 92 to seal the reservoir 56. To fill the brake system 36 with brake fluid 58, an adapter 40 is sealed to the bleeder fitting 108. The adapter 40, as shown in FIGS. 9 and 10, includes clamped and unclamped positions, and also may be selectively coupled to a vacuum source and a source of brake fluid. The bleeder fitting 108 is then opened, and the adapter 40 is connected to the vacuum source and evacuates fluid (air, moisture, liquid, etc.) from the reservoir 56, cavity of the housing 52, brake line 46, passageway and cavities of the caliper assembly 44. The sight glass 66 includes a rib 114 between the middle portion 72 and the bottom portion 70. The rib 114 along with the interference fit between the bottom portion 70 and the gasket 92 resist movement of the sight glass 66 into the reservoir 56 when the system is being evacuated. In other embodiments, the sight glass 66 may not include rib 114, and the interference fit between the bottom portion 70 and the gasket 92 is sufficient to resist movement of the sight glass 66 into the reservoir. The vacuum can be held and monitored for a period of time to determine if there is any decay over the period of time, which could indicate a leak within the brake system 36. When the brake system 36 is evacuated, the ribbed portion 100 of the gasket 92 flexes downward caused by the pressure of the air remaining on the top side of the gasket 92.

Figure 6:
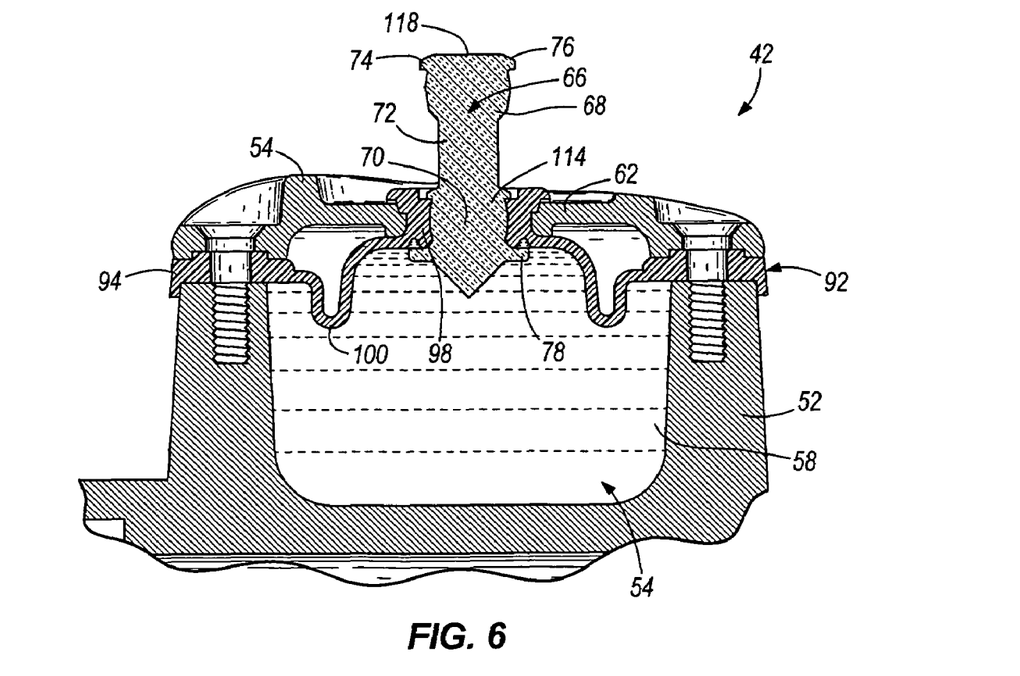
FIG. 6 is a view similar to FIG. 5, illustrating a reservoir of the master cylinder assembly filled with a fluid.

If no decay is detected, the adapter 40 is connected to a source of brake fluid 58 and the fluid 58 is directed from the adapter 40 and into the brake system 36 through the bleeder fitting 108. The fluid 58 can be introduced for a specific period of time or until a specific pressure is surpassed. The bottom flange 78 and the interference fit between the bottom portion 70 and the gasket 92 resist movement of the sight glass 66 out of the reservoir 56 when the system 36 is being filled. The fluid 58 fills the entire reservoir 56 below the gasket 92, and the ribbed portion 100 of the gasket 92 returns to approximately its original position (FIG. 5). At this time, the adapter 40 goes into a scavenge mode drawing back a portion of the fluid 58 in the brake system 36 to set the desired level of fluid 58. The ribbed portion 100 of the gasket 92 again flexes downward slightly as shown in FIG. 6.

Figure 7:
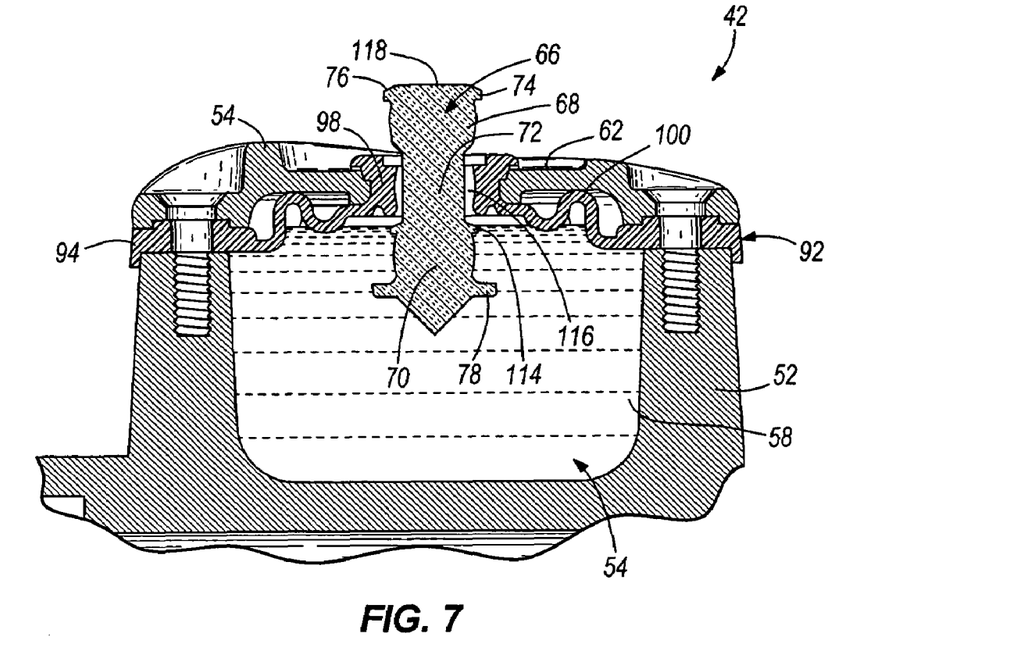
FIG. 7 is a view similar to FIG. 6, illustrating the sight glass between the raised and lowered positions.

Next, the cap 112 is removed from the sight glass 66, and the sight glass 66 is moved from the raised position to the lowered position. The pushing of the sight glass 66 to the lowered position introduces air into the reservoir 56. The introduction of air is important because it allows the proper refractory characteristics for the sight glass 66 to properly indicate the level of the fluid 58 within the reservoir 56. Without the introduction of the air into the reservoir 56, the sight glass 66 may provide an inaccurate indication of the fluid level. As shown in FIG. 7, as the middle portion 72 passes through the apertures 60, 96, a gap 116 is created between the gasket 92 and the middle portion 72 allowing air to vent into the reservoir 56 under the gasket 92. The air pressure below the gasket 92 equalizes with the air pressure above the gasket 92 and the ribbed portion 100 of the gasket 92 is allowed to return to its original position.

Figure 8:
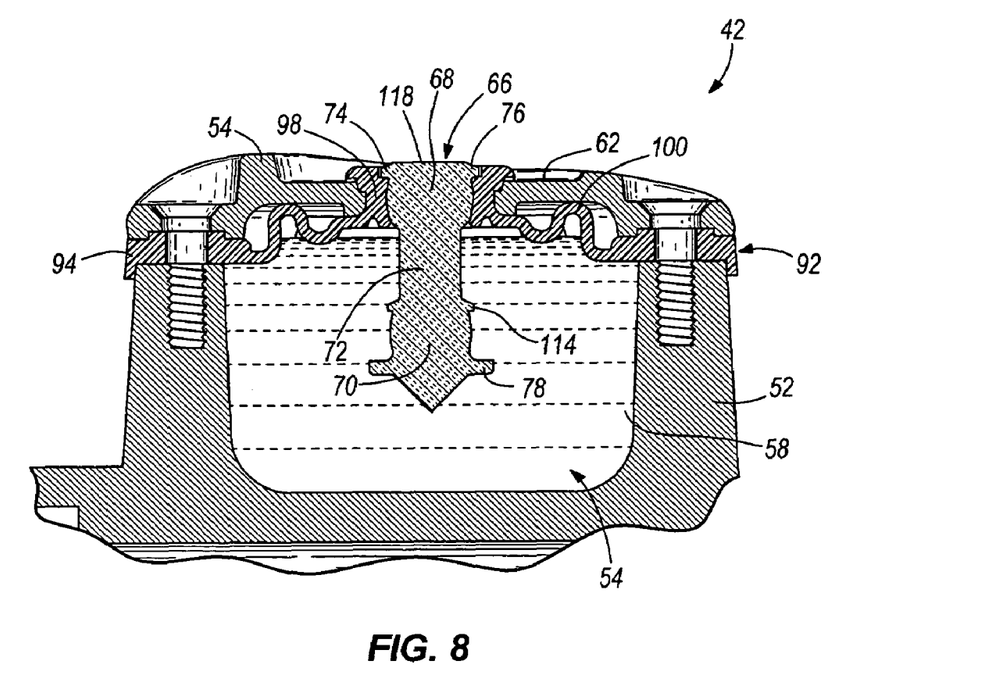
FIG. 8 is a view similar to FIG. 7, illustrating the sight glass in the lowered position.

As shown in FIG. 8, the sight glass 66 is moved to the lowered position where the top portion 68 seals against the gasket 92 and seals the reservoir 56. The top flange 74 resists movement of the sight glass 66 further into the reservoir 56, and the interference between the top portion 68 and the gasket 92 resists movement of the sight glass 66 out of the reservoir 56. In this position, the top 118 of the sight glass 66 is exposed and provides a visual indication of the level of the fluid 58 within the reservoir 56. When full, the entire circular top surface 118 of the sight glass 66 will be darkened. As the fluid level decreases, the circular darkened area of the top surface 118 will become concentrically smaller.

After the sight glass 66 is moved to the lowered position, the bleeder fitting 108 is closed and the adapter 40 is removed from the bleeder fitting 108.

Thus, the invention provides, among other things, a brake system fill process that can fill the brake system without removing the cover of the master cylinder assembly. The ability to fill the brake system while maintaining the cover connected reduces the likelihood of cosmetic damage to the motorcycle caused by spillage of the brake fluid and decreases the process cycle times thereby reducing the cost to manufacture the motorcycle. Various features and advantages of the invention are set forth in the following claims.

What is claimed is:

1. A method of filling a brake system for a motorcycle including a brake system having a master cylinder assembly and a caliper assembly, the master cylinder assembly including a housing and a cover coupled to the housing to define an enclosed reservoir, the caliper assembly including a fluid passageway and a fitting adjustable to selectively provide fluid communication with the fluid passageway, the motorcycle also including a brake line coupled between the master cylinder assembly and the caliper assembly to fluidly connect the reservoir and the fluid passageway, the method comprising:

substantially evacuating the reservoir, brake line and fluid passageway;

coupling a fluid source to the fitting;

passing fluid from the fluid source through the fitting; and filling the reservoir, brake line, and fluid passageway with the fluid passed through the fitting from the fluid source, wherein the brake system further comprises a sight glass movably coupled to the cover between a raised position and a lowered position, wherein substantially evacuating includes substantially evacuating while the sight glass is in the raised position, and wherein filling includes filling while the sight glass is in the raised position.

2. The method of claim 1, further comprising moving the sight glass from the raised position to the lowered position after filling the reservoir, brake line, and fluid passageway.

3. The method of claim 2, further comprising venting air into the reservoir while moving the sight glass from the raised position to the lowered position.

4. The method of claim 3, further comprising sealing the reservoir with the sight glass when the sight glass is in the lowered position.

5. A method of filling a brake system for a motorcycle including a brake system having a master cylinder assembly and a caliper assembly, the master cylinder assembly including a housing and a cover coupled to the housing to define an enclosed reservoir, the caliper assembly including a fluid passageway and a fitting adjustable to selectively provide fluid communication with the fluid passageway, the motorcycle also including a brake line coupled between the master cylinder assembly and the caliper assembly to fluidly connect the reservoir and the fluid passageway, the method comprising:

substantially evacuating the reservoir, brake line and fluid passageway;

coupling a fluid source to the fitting;

passing fluid from the fluid source through the fitting;

filling the reservoir, brake line, and fluid passageway with the fluid passed through the fitting from the fluid source; and maintaining the cover on the housing of the master cylinder assembly during evacuation of the reservoir, brake line and fluid passageway, during coupling of the fluid source to the fitting, during passing of fluid from the fluid source through the fitting, and during filling of the reservoir, brake line, and fluid passageway.

6. The method of claim 5, further comprising coupling a vacuum source to the fitting, and wherein substantially evacuating includes substantially evacuating the reservoir, brake line, and fluid passageway through the fitting.

7. The method of claim 5, further comprising opening the filling before passing fluid from the fluid source, and closing the fitting after filling the reservoir, brake line, and fluid passageway.

8. The method of claim 5, further comprising drawing a portion of the fluid back from the reservoir, brake line, and fluid passageway through the fitting.

* * * * *